(12) United States Patent
Key et al.

(10) Patent No.: US 8,066,879 B2
(45) Date of Patent: Nov. 29, 2011

(54) METHOD FOR TREATING WASTE WATER

(75) Inventors: James Rhrodrick Key, Lexington, NE (US); Ricky Eugene Roberts, Greeley, CO (US); Griscom Bettle, III, Sarasota, FL (US)

(73) Assignee: Absolute Aeration, Greeley, CO (US)

( * ) Notice: Subject to any disclaimer, the term of this patent is extended or adjusted under 35 U.S.C. 154(b) by 139 days.

(21) Appl. No.: 12/486,557

(22) Filed: Jun. 17, 2009

(65) Prior Publication Data

US 2010/0320145 A1    Dec. 23, 2010

(51) Int. Cl.
*C02F 3/00*    (2006.01)

(52) U.S. Cl. ..... 210/603; 210/615; 210/629; 210/747.5; 210/747.6; 405/80

(58) Field of Classification Search .......... 210/603, 210/615, 617, 629, 747, 747.5, 747.6; 405/80
See application file for complete search history.

(56) References Cited

U.S. PATENT DOCUMENTS

| | | | | |
|---|---|---|---|---|
| 2,638,444 A * | 5/1953 | Kappe | ............ | 210/603 |
| 3,043,433 A * | 7/1962 | Singer | ............ | 210/629 |
| 4,482,458 A * | 11/1984 | Rovel et al. | ............ | 210/617 |
| 4,724,086 A * | 2/1988 | Kortmann | ............ | 210/747 |
| 4,818,404 A * | 4/1989 | McDowell | ............ | 210/603 |
| 5,549,828 A * | 8/1996 | Ehrlich | ............ | 210/617 |
| 5,565,096 A * | 10/1996 | Phelan | ............ | 210/150 |
| 6,428,711 B1 * | 8/2002 | Nakamura et al. | ............ | 210/747 |
| 6,533,496 B1 * | 3/2003 | Elliott | ............ | 405/80 |
| 2007/0251880 A1 * | 11/2007 | Herding et al. | ............ | 210/603 |
| 2008/0087610 A1 * | 4/2008 | Tormaschy et al. | ............ | 210/747 |

FOREIGN PATENT DOCUMENTS

| | | |
|---|---|---|
| KR | 10-2002-0068804 A | 8/2002 |
| KR | 10-0409056 B1 | 3/2004 |
| KR | 10-0432298 B1 | 5/2004 |
| KR | 20-0355479 Y1 | 7/2004 |

OTHER PUBLICATIONS

International Search Report dated Mar. 8, 2010 corresponding to PCT/US2009/047627.

* cited by examiner

*Primary Examiner* — Christopher Upton
(74) *Attorney, Agent, or Firm* — Scully, Scott, Murphy & Presser, P.C.

(57) ABSTRACT

An apparatus and method for passively generating a current flow in a body of water is disclosed. The passive water circulating apparatus has an aeration plate having a central opening; a plurality of flotation members joined to the aeration plate, the plurality of flotation members being adapted and disposed for maintaining buoyancy of the aeration plate above a water surface; an uplift tube member having a central orifice in fluid communication with the central opening of the aeration plate; a concentrator member disposed at an end of the uplift tube opposite the aeration plate, the concentrator member having a bottom opening in fluid communication with an upper opening, the bottom opening being wider than the upper opening and the upper opening being connected to the uplift tube member; and a plurality of bio-substrates suspended from the concentrator member below the bottom opening, the plurality of bio-substrates providing a substrate for growth of microbes.

6 Claims, 3 Drawing Sheets

METHOD FOR TREATING WASTE WATER

FIELD OF THE INVENTION

The present invention relates generally to waste water treatment. More specifically, the present invention relates to a method for generating discrete flows in a body of water, resulting in greater biological activity and consequent increase in in situ sludge digestion. As defined herein, a body of water has a depth of at least 3 feet and can be as much as 50 feet, and the water temperature thereof is greater than the freezing point of water. The body of water may have no flow or stagnant flow or may have a flow like a river. However, the body of water is not an ocean or a sea and it has at least two banks thereof, which can be seen with the naked eye or with binoculars at 300× magnification. As defined the body of water usually leads to a second body of water which is larger. Examples of the body of water in this application include ponds, rivers, channels, streams, bays, springs, creaks, moats, millponds, lakes, reservoirs and the like.

BACKGROUND OF THE DISCLOSURE

In waste treatment ponds and lakes, aerobic microbes eat waste in the presence of dissolved oxygen, producing carbon dioxide ($CO_2$) and waste sludge in the process. In turn, facultative organisms eat the waste sludge and expel liquefied waste. This liquefied waste provides nutrients for other organisms, which turn the liquefied waste into short chain volatile fatty acids (VFA). These VFA generally cause a drop in pH of the pond water towards approximately 5.5 (7.0 being the pH of pure water). Still other organisms process the VFA and produce acetic acid, which further depresses the pH of the water to below 5.5. Methanogenic microbes reduce the acetic acid to methane and $CO_2$. With the acetic acid being broken down, the pH of the water once again begins to rise. This process occurs naturally in healthy bodies of water; and is mimicked in sewage treatment and pollution mitigation processes.

The process described above is in dynamic equilibrium where one process is dependent on the product of the preceding reaction. If any one reaction is overly encouraged, the system becomes unbalanced, leading to a break down in the efficiency of the water system to process out organic waste. In natural, as well as man-made, water systems, circulation of the water in the system is very important for maintaining the proper aeration of the water and functioning of the waste removal processes.

Responsive to the need for water circulation to increase dissolved oxygen levels and waste removal processes, circulation devices are often utilized in waste treatment ponds and in highly polluted lakes. However, these water circulation devices employ motors, which require a power source. Consequently, the conventional circulator devices are quite expensive, and thus prohibitive for widespread use especially in poorer regions that are most likely to have polluted bodies of water.

SUMMARY OF THE DISCLOSURE

The present invention provides a passive water circulating apparatus having an aeration plate having a central opening; a plurality of flotation members joined to the aeration plate, the plurality of flotation members being adapted and disposed for maintaining buoyancy of the aeration plate above a water surface; an uplift tube member having a central orifice in fluid communication with the central opening of the aeration plate; a concentrator member disposed at an end of the uplift tube opposite the aeration plate, the concentrator member having a bottom opening in fluid communication with an upper opening, the bottom opening being wider than the upper opening and the upper opening being connected to the uplift tube member; and a plurality of bio-substrates suspended from the concentrator member below the bottom opening, the plurality of bio-substrates providing a substrate for growth of microbes.

In an embodiment of the present invention, the passive water circulating apparatus of the present invention optionally includes an aeration device situated at a position along a path of the fluid communication, the aeration device adapted for generating bubbles directed into the path of the fluid communication.

In another embodiment, the passive water circulating apparatus of the present invention optionally includes a perforated inlet member positioned between the uplift tube member and the concentrator member and connecting the uplift tube member to the concentrator member.

In another embodiment for passively generating current flow in a body of water, the present invention performs the steps of promoting growth of microbes on a plurality of bio-substrates; funneling waste gases produced by the microbes along a confined fluid path; transporting water through the fluid path using the waste gases; and releasing the waste gases and transported water at an opening of the confined fluid path located at or above a water surface.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
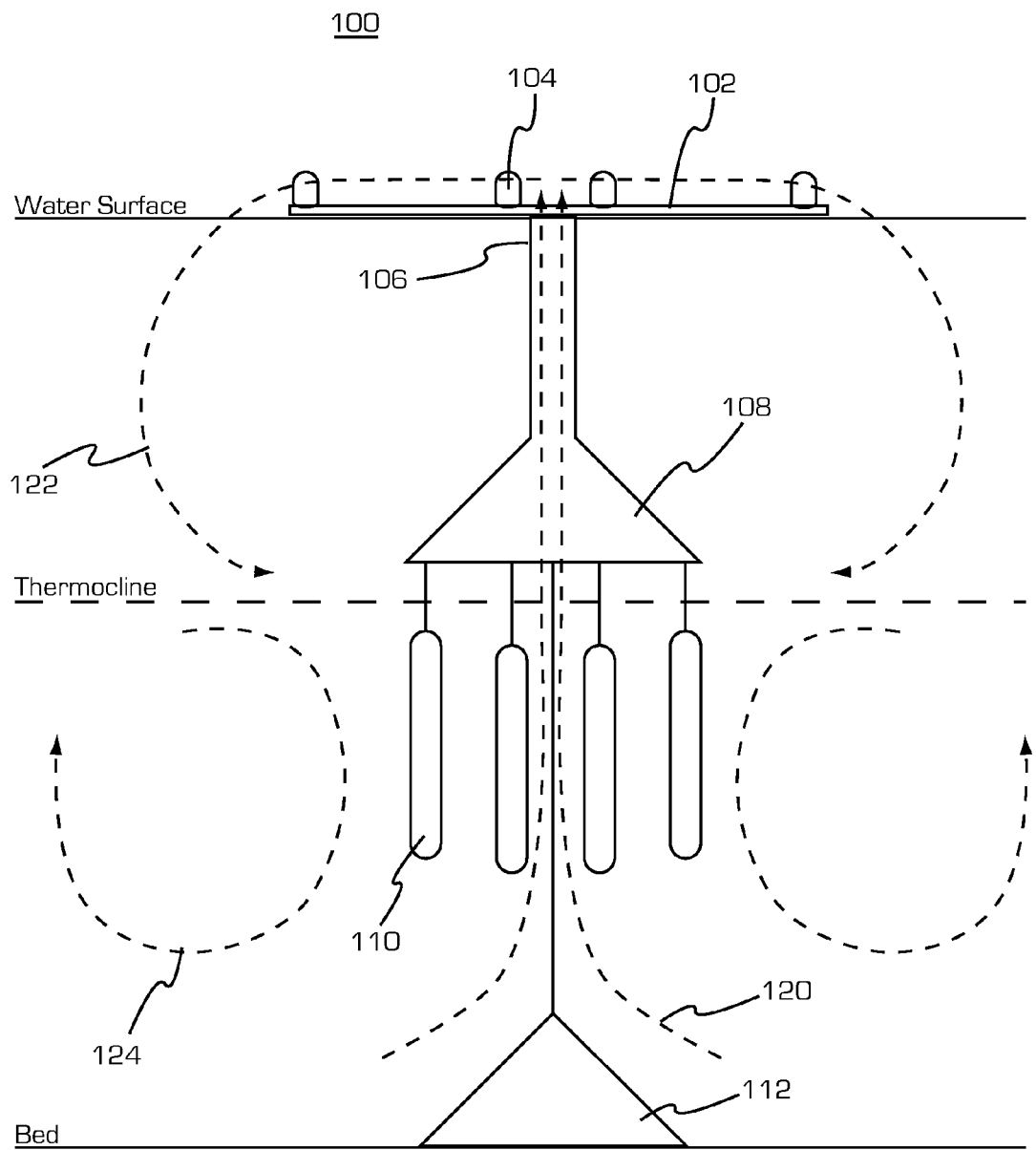
FIG. 1 illustrates a schematic representation of an embodiment of a passive circulator in accordance with the present invention.

An embodiment of a passive circulator 100 shown in FIG. 1, is constructed of an aeration plate 102 formed of a high density plastic material, such as polyethylene (HDPE) plastic. Since HDPE has a similar density to water, flotation members 104 are disposed at intervals along a surface of the aeration plate 102 to provide increased buoyancy. The aeration plate 102 has a central opening through which upwelling water can flow.

An uplift tube member 106 is attached to the central opening. The uplift tube member 106 has an orifice running the length of the uplift tube member 106 through which water can pass. The uplift tube member 106 is connected to the aeration plate 102 so that water can flow up the uplift tube orifice, through the central opening, and radiate out over the aeration plate 102, to flow back into the body of water. The passive process by which this water flow is generated will be discussed in further detail below.

At a bottom end of the uplift tube member 106, opposite the aeration plate 102, a concentrator member 108 is attached. The concentrator member 108 is generally shaped as a funnel, with a large diameter opening at a lower portion. In an embodiment, it has a smaller diameter opening at an upper portion thereof. The upper and lower portion openings are in fluid communication with one another. The concentrator 108 receives an influx of a water and bubble mixture at the lower opening and funnels the mixture up and through the upper opening. The mixture flows through the upper opening and into the uplift tube member 106, and eventually to the aeration plate 102.

The bubbles mentioned above, and the driving force behind the water flow generation of the present embodiment is provided by anaerobic and facultative microbes that produce methane and/or $CO_2$ gases as waste products in their digestion process. These microbes are grown on a plurality of bio-substrate members 110 that are suspended directly below, and along the perimeter of, the lower opening of the concentrator member 108. The bio-substrate members 110 can be formed of any non-degradable material that allows microbes to easily attach and grow on its surfaces. The bio-substrate members 110 have a large surface area. The biomat must have sufficient amount of surface area to sustain and grow the microbes. At too low a surface area, there is not sufficient area to support a thriving diverse biological community; at too high a surface area, the microbes grow across the gaps and plug the biomat. In another embodiment, the biosubstrate member 110 has a sufficient surface area per volume of material ratio to grow and sustain the microbes. For example, in an aspect of the present invention the ratio of surface area to volume of the biomat ranges from about 200 $ft^2/ft^3$ to about 700 $ft^2/ft^3$ of material. In another embodiment, the ratio of surface area to volume of the biomat ranges from about 250 $ft^2/ft^3$ to about 600 $ft^2/ft^3$ of material. In still another embodiment, the ratio of surface area to volume of the biomat ranges from about 300 $ft^2/ft^3$ to about 500 $ft^2/ft^3$ of material. Although the biomat can be any shape, in one embodiment, the biomat is shaped like a coil, cylinder or spring. Interwoven materials, such as polyester-based aquarium filter medium is one embodiment of the type of material that can be used as a biomat. The biomat is preferably porous. In an embodiment, the biomat is open weaved to allow water to flow through fully, so that the microbes have access to nutritional rich water. The open weave biomats are available at Polyflow Pond Filters, Acworth, Ga.

Any other material known in the art that meets the criteria outlined above of promoting microbe growth and having a large surface area may be used as well. The biosubstrate has a sufficient surface area to volume ratio that permits microbes to attach and grow to produce a bubble column, as described below.

The entire apparatus described above is anchored to the lake/pond bed using an anchor base 112.

Once the microbe population reaches a steady state, that is, the total mass of material attached to the bio-substrate members 110 is substantially not changing ("critical mass"), on the bio-substrate members 110, the waste gases produced by these microbes as they break down waste matter in the water form a bubble column directly below the lower opening of the concentrator member 108. The cohesive properties of water cause the bubbles, which are rising to the surface through the apparatus of the present invention, to create an upflow current 120 that carries water from the lower levels of the lake or pond upward as well. In this way, a passive current is generated through the concentrator member 108 and out, over the aeration plate 102. As water outflows over the aeration plate 102, methane and $CO_2$ are expelled into the atmosphere, while oxygen dissolves into the water. Consequently, the dissolved oxygen content of the water increases.

The outflow of water over the aeration plate 102 generates downward water current 122. Generally, the generated water current 122 circulates above a thermocline layer. Below the thermocline layer, an induced current 124 develops as a result of the upflow current 120 and the generated current 120. In general usage, the thermocline is a difference in density caused by warmer temperature water situated above and in fluid communication with a lower, colder, denser layer of water. As used herein, the thermocline may be natural or it may be "unnatural", as the low density/high density interface is influenced by the apparatus 100. As used herein, the thermocline is defined as the interface between a low density layer and a high density layer, situated on top thereof, regardless of the cause of the density difference.

In addition to the generated current 120, the increased biomass present on the bio-substrates 110 attracts fish to the area, since the biomass acts as the initial link in the food chain. The feeding action of the fish on the microbes living on the bio-substrates 110 helps maintain a productive and efficient mitigation of organic pollutants in the water.

The present invention described above has the advantages of circulating and oxygenating large volumes of water without the need of an external power source; promoting anaerobic digestion of nutrients and organic pollutants; encouraging an increase in fish populations; reducing algae growth; and reducing surface malodor caused by hydrogen sulfide produced from decay of organic matter in the absence of oxygen.

Figure 2:
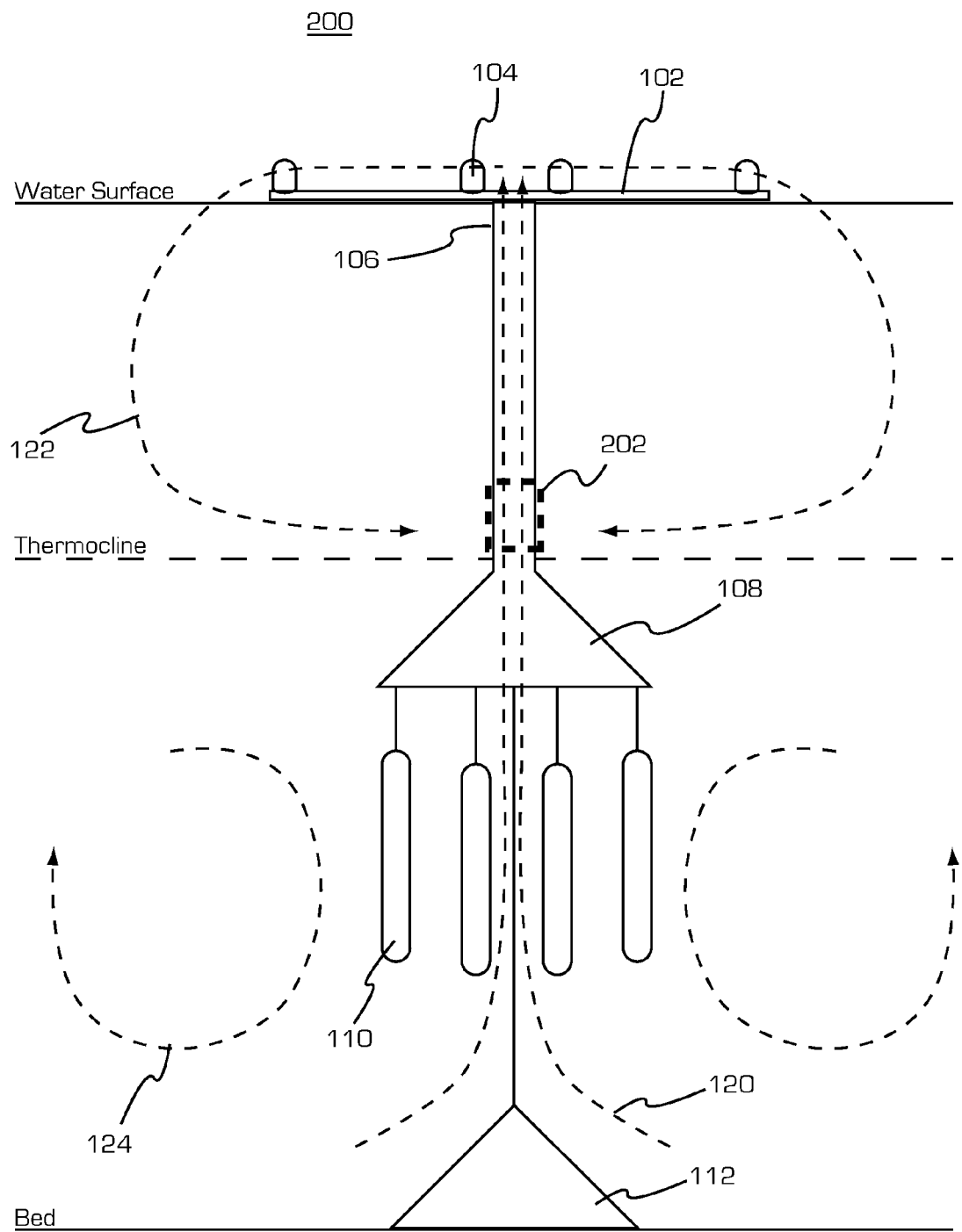
FIG. 2 illustrates a schematic representation of another embodiment of a passive circulator in accordance with the present invention.

Referring to FIG. 2, a second embodiment of a passive circulator 200 is shown. Elements of the present embodiment that are similar to elements in the embodiment shown in FIG. 1 are assigned the same reference numerals. Essentially, the present embodiment operates in much the same way as described for the previous embodiment. The difference lies in the presence of a perforated inlet portion 202 disposed at a lower area of the uplift tube member 106.

The perforated inlet portion 202 draws water from the region above the thermocline layer into the uplift tube member 106 and mixes this water with water being drawn in by the upflow current 120 below the thermocline layer. This design increases the recirculation rate of current 122 compared to the current 120. The net effect to increase the concentration of dissolved oxygen above the thermocline, as current 122 is so much larger in system 200 than in system 100. In both systems, the sum of flows 122 and 120 are about the same.

This design reduces the transport of malodorous gases produced in anaerobic regions of the body of water—usually located in deep calm areas below the thermocline—to the surface. By allowing the upper region oxygenated water to mix with the deep anaerobic water during the upflow, the amount of deep-water upflow is reduced and thus the malodorous gases from the deep-water regions of the body of water are released into the atmosphere at a slower rate, preferably at a rate that is generally undetectable by people.

Figure 3:
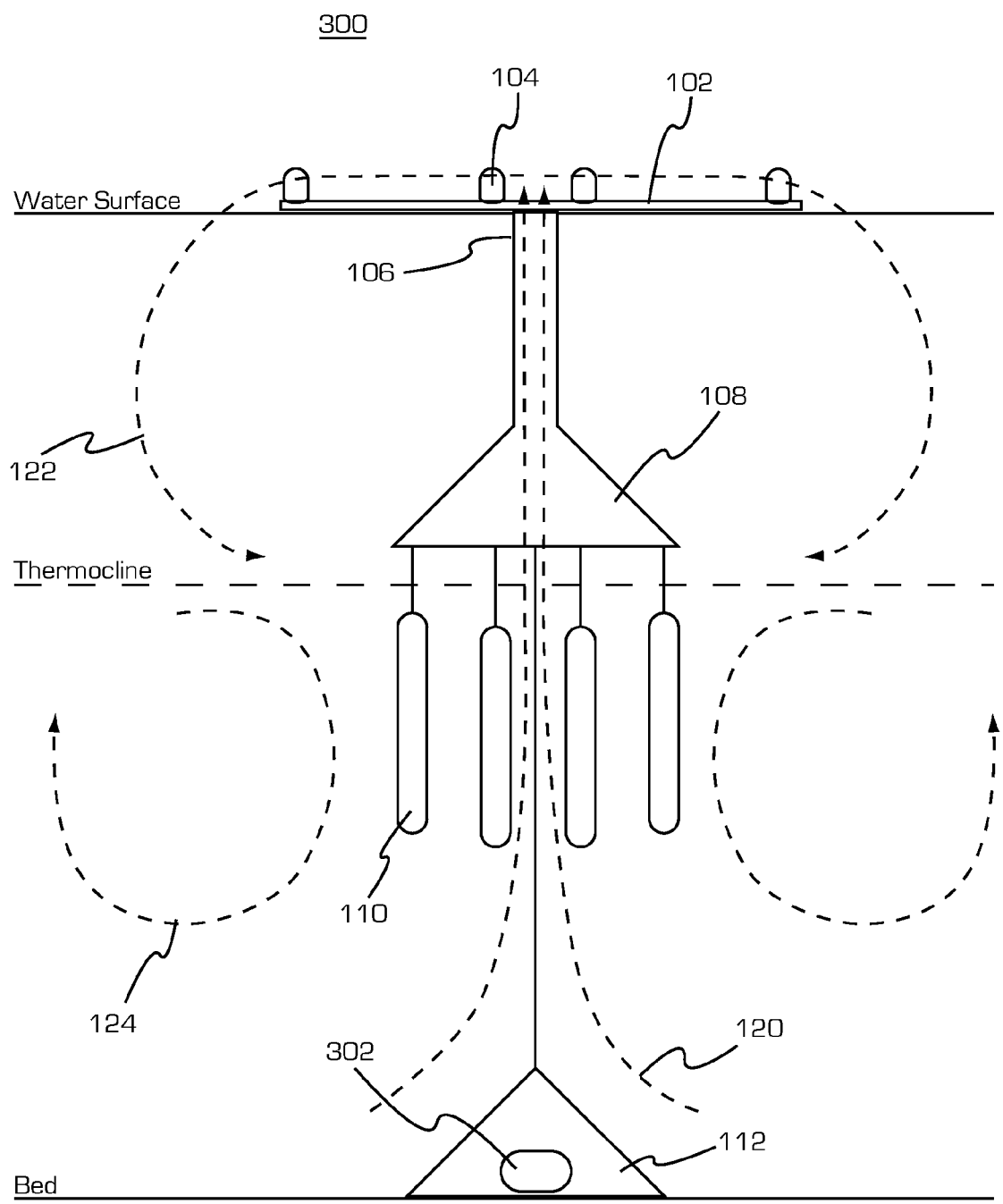
FIG. 3 illustrates a schematic representation of a further embodiment of a passive circulator in accordance with the present invention.

Another embodiment of a passive circulator 300, shown in FIG. 3, is equipped with an aeration device 302. All other structural elements of the present invention are identical to the embodiment shown in FIG. 1 and thus are referenced using identical reference numerals as in FIG. 1.

With the addition of an aeration device 302, the passive circulator 300 can begin operating immediately after installation, unlike the embodiment shown in FIG. 1, which requires many days to build up the required steady-state mass of microbes on the surface of the bio-substrate 110. Until the bio-substrate 110 is sufficiently populated with microbes in the embodiment shown in FIG. 1, the passive circulator operates inefficiently. The aeration device 302, on the other hand, begins mechanically generating bubbles immediately, causing water to flow upward into the concentrator member 108, as described hereinabove.

As the biomass increases on the bio-substrate 110, the bubble volume, and thus the upflow current increase as well. Once the optimal biomass is reached, the aeration device 302 can be turned off or removed. Alternatively, the aeration device 302 can be used to provide additional upflow current.

In FIG. 3, the aeration device 302 is shown as being placed on the lake/pond bed. However, the aeration device 302 can be placed at any point along the upflow path. In fact, when the body of water contains a significant amount of malodorous gases at deep water levels, the aeration device 302 can be advantageously placed within the concentrator member 108 or uplift tube member 106 above the thermocline layer. In this way, the amount of deep water transported to the surface can be reduced.

Moreover, elements of the various exemplar embodiments disclosed above can be advantageously combined and/or removed as necessary to meet the specific needs of a given application.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for passively generating current flow in a body of water, the method comprising:
    promoting growth of microbes on a plurality of bio-substrates;
    funneling waste gases produced by the microbes along a confined fluid path;
    transporting water through the fluid path using the waste gases; and
    releasing the waste gases and transported water at an opening of the confined fluid path located at or above a water surface.

2. The method as in claim 1, wherein the microbes are grown below a thermocline layer.

3. The method as in claim 1, further comprising supplementing the waste gases with mechanically-generated bubbles.

4. The method as in claim 1, wherein the transported water is drawn from an area below a thermocline layer.

5. The method as in claim 1, further comprising radiating the transported water for a defined distance parallel to the water surface before reintroducing the transported water into the body of water.

6. The method as in claim 5, wherein the transported water is radiated across an aeration plate disposed at a top surface of the body of water.

\* \* \* \* \*